US008897796B2

(12) United States Patent
Reudink

(10) Patent No.: US 8,897,796 B2
(45) Date of Patent: Nov. 25, 2014

(54) ORDERED LIST CHANNEL ASSIGNMENTS

(75) Inventor: Douglas O. Reudink, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/197,151

(22) Filed: Aug. 3, 2011

(65) Prior Publication Data

US 2011/0286351 A1 Nov. 24, 2011

Related U.S. Application Data

(63) Continuation of application No. 11/777,801, filed on Jul. 13, 2007, now Pat. No. 8,010,118, which is a continuation of application No. 11/172,604, filed on Jun. 30, 2005, now Pat. No. 7,257,376.

(51) Int. Cl.
H04B 7/00 (2006.01)
H04B 15/00 (2006.01)
H04B 17/00 (2006.01)
H04W 4/00 (2009.01)
H04W 40/00 (2009.01)
H04W 72/00 (2009.01)
H04W 74/00 (2009.01)
H04W 16/10 (2009.01)
H04W 72/08 (2009.01)

(52) U.S. Cl.
CPC ............ H04W 72/085 (2013.01); H04W 72/08 (2013.01); H04W 16/10 (2013.01)
USPC .......... 455/450; 455/62; 455/63.1; 455/226.2; 455/422.1; 455/446; 455/447; 455/448; 455/449; 455/452.1; 455/455; 455/464; 455/509; 455/512; 455/513; 455/515

(58) Field of Classification Search
USPC ........ 455/456.2, 446, 422.1, 552.1, 449, 423, 455/504, 447, 450, 452.1, 452.2, 62, 63.1, 455/226.2, 448, 455, 464, 509, 512, 513, 455/515; 370/208, 330, 280, 281, 329, 341
See application file for complete search history.

(56) References Cited

U.S. PATENT DOCUMENTS 5,293,641 A * 3/1994 Kallin et al. .................. 455/453
5,787,352 A * 7/1998 Benveniste ................ 455/452.2

(Continued)

FOREIGN PATENT DOCUMENTS

CN 1138480 2/2013
EP 1 119 113 A2 7/2001

(Continued)

OTHER PUBLICATIONS

Office Action issued for Japanese patent application No. 2008-519329, dated Nov. 2, 2011, 4 pages.

(Continued)

Primary Examiner — Inder Mehra
(74) Attorney, Agent, or Firm — John Jardine; Kate Drakos; Micky Minhas

(57) ABSTRACT

There is disclosed a system and method for improving wireless system capacity by reducing collisions where the Signal to Interference Ratio (SIR) is high in systems having a channel reuse of 1. By ordering the channel assignment in each of the interfering cells according to a pattern, for example, according to the distance from a base station (determined by power levels), the mobile stations will become paired on the same channel in a manner to reduce interference between them. In one embodiment, this intelligent assignment is accomplished by assigning mobile stations in one cell such that the mobile station having the strongest signal is assigned channel A while in the interfering cell the mobile station with the weakest signal is assigned to channel A. In another embodiment, certain preferred mobile stations are assigned either interference-free channels or channels paired with weak interference mobile stations.

20 Claims, 2 Drawing Sheets

(56) References Cited

U.S. PATENT DOCUMENTS

| | | | |
|---|---|---|---|
| 5,794,157 A * | 8/1998 | Haartsen | 455/522 |
| 5,884,145 A | 3/1999 | Haartsen | |
| 5,915,221 A * | 6/1999 | Sawyer et al. | 455/437 |
| 6,075,991 A * | 6/2000 | Raleigh et al. | 455/450 |
| 6,175,734 B1 * | 1/2001 | Desgagne et al. | 455/437 |
| 6,388,999 B1 | 5/2002 | Gorsuch et al. | |
| 6,411,817 B1 * | 6/2002 | Cheng et al. | 455/522 |
| 6,711,415 B1 * | 3/2004 | McCarthy | 455/522 |
| 6,983,150 B2 | 1/2006 | Dixon | |
| 7,106,713 B2 | 9/2006 | Pankaj | |
| 7,257,376 B2 * | 8/2007 | Reudink | 455/63.1 |
| 7,474,895 B1 * | 1/2009 | Jiang et al. | 455/447 |
| 7,920,870 B1 * | 4/2011 | Bhatia et al. | 455/444 |
| 8,010,118 B2 * | 8/2011 | Reudink | 455/446 |
| 2001/0041574 A1 * | 11/2001 | Bergenlid et al. | 455/452 |
| 2002/0027957 A1 * | 3/2002 | Paulraj et al. | 375/267 |
| 2002/0072373 A1 * | 6/2002 | Muramoto et al. | 455/446 |
| 2002/0154705 A1 | 10/2002 | Walton et al. | |
| 2004/0127223 A1 | 7/2004 | Li et al. | |
| 2005/0096061 A1 | 5/2005 | Ji et al. | |
| 2005/0249322 A1 | 11/2005 | Gerlach | |
| 2006/0056360 A1 * | 3/2006 | Parkvall et al. | 370/335 |
| 2006/0135169 A1 * | 6/2006 | Sampath et al. | 455/447 |
| 2006/0153283 A1 | 7/2006 | Scharf et al. | |
| 2013/0170370 A1 | 7/2013 | Reudink | |
| 2013/0170371 A1 | 7/2013 | Reudink | |

FOREIGN PATENT DOCUMENTS

| | | |
|---|---|---|
| IL | 187577 | 3/2013 |
| JP | 07-245776 A | 9/1995 |
| JP | 09-037337 A | 2/1997 |
| JP | 10308972 | 11/1998 |
| JP | 2001-036463 A | 2/2001 |
| JP | 2001-339342 A | 12/2001 |
| KR | 101258824 | 4/2013 |
| TW | I393456 | 4/2013 |
| WO | WO-96/31075 | 10/1996 |
| WO | WO-97/33377 | 9/1997 |
| WO | WO-98/09465 | 3/1998 |
| WO | WO-2006107656 | 10/2006 |

OTHER PUBLICATIONS

International Search Report and Written Opinion issued for PCT/US2006/022296; Dated: Apr. 10, 2008; 12 Pages.

Extended European Search Report issued for European Patent Application No. 06772558.0, dated Mar. 31, 2011, 9 pages.

"Final Office Action", U.S. Appl. No. 11/777,801, (Oct. 1, 2010), 31 pages.

"Foreign Office Action", Israel Application No. 187577, (Nov. 23, 2011), 4 pages.

"Non-Final Office Action", U.S. Appl. No. 11/172,604, (Oct. 6, 2006), 11 pages.

"Non-Final Office Action", U.S. Appl. No. 11/777,801, (Feb. 17, 2010), 24 pages.

"Notice of Allowance", U.S. Appl. No. 11/172,604, (Apr. 6, 2007), 8 pages.

"Notice of Allowance", U.S. Appl. No. 11/777,801, (Apr. 20, 2011), 9 pages.

"Notice of Allowance", U.S. Appl. No. 11/777,801, (May 23, 2011), 6 pages.

"Foreign Notice of Allowance", Japanese Application No. 2008-519329, (Mar. 15, 2012), 6 pages.

"Foreign Office Action", Chinese Application No. 200680023343.3, (Mar. 26, 2012), 8 pages.

"Foreign Notice of Allowance", Israel Application No. 187577, (Aug. 8, 2012), 2 pages.

"Foreign Office Action", Chinese Application No. 200680023343.3, (Jul. 20, 2012), 7 pages.

"Foreign Office Action", Korean Application No. 10-2008-7002361, (Aug. 16, 2012), 6 pages.

"Foreign Office Action", Taiwan Application No. 095122305, (Aug. 29, 2012), 10 pages.

"Foreign Notice of Allowance", Korean Application No. 10-2008-7002361, Jan. 25, 2013, 3 pages.

"Foreign Notice of Allowance", Chinese Application No. 200680023343.3, Nov. 6, 2012, 4 pages.

"Foreign Notice of Allowance", Taiwan Application No. 095122305, Dec. 12, 2012, 4 pages.

"IEEE 802.11a-1999", From Wikipedia, the free encyclopedia, downloaded from <http://en.wikepedia.org/wiki/IEEE_802.11a-1999> on Mar. 12, 2013, 5 pages.

"Initial OFDMA/OFDMA PHY proposal for the 802.16.3 BWA", Oct. 30, 2000, 21 pages.

CHEONGal.,"Multiuser OFDM with Adaptive Subcarrier, Bit, and Power Allocation", IEEE Journal on Selected Areas in Communications, vol. 17, No. 10, Oct. 1999, pp. 1747-1758.

"Foreign Office Action", Canadian Application No. 2609120, (Mar. 28, 2013), 3 pages.

"Foreign Office Action", CA Application No. 2,609,120, Feb. 3, 2014, 4 pages.

"Non-Final Office Action", Application No. 13/714,183, Jul. 31, 2014, 21 pages.

"Non-Final Office Action", U.S. Appl. No. 13/714,206, Aug. 1, 2014, 26 pages.

* cited by examiner

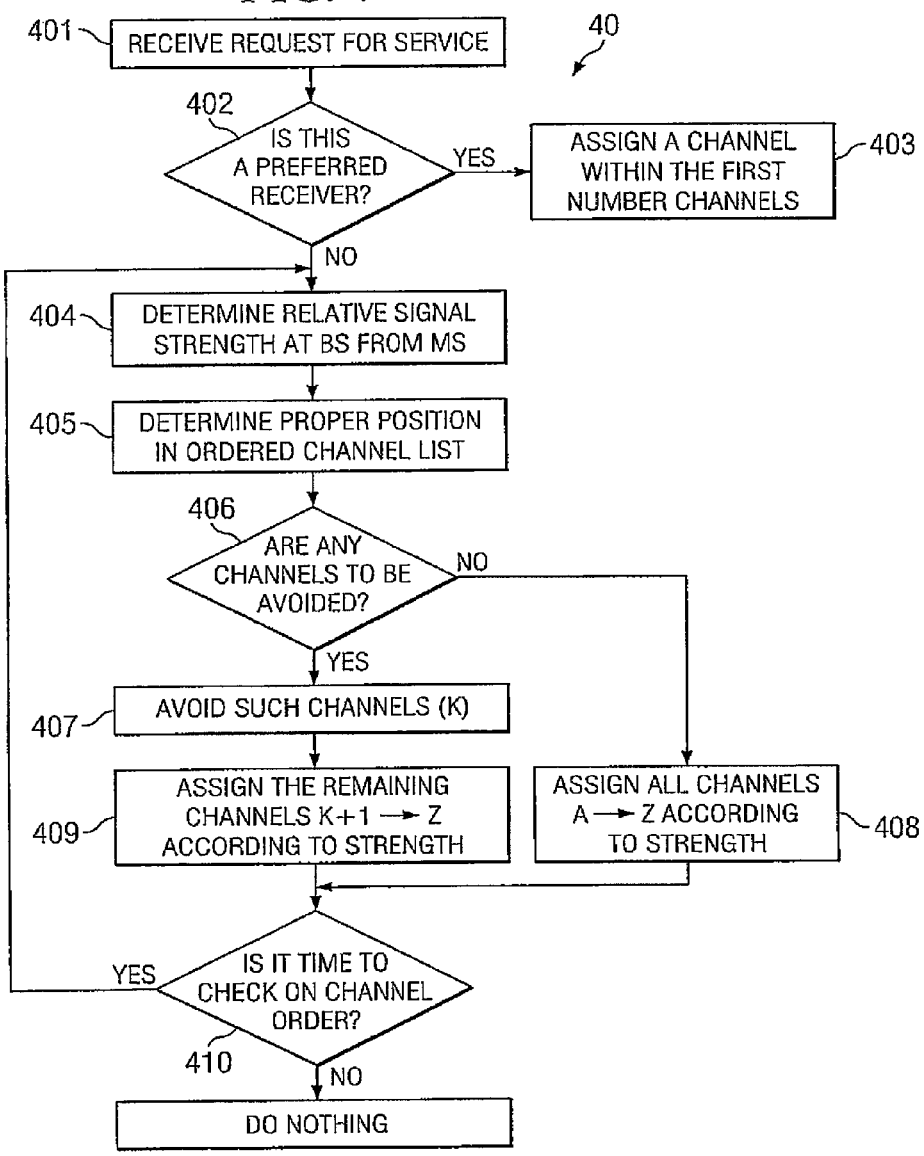

ORDERED LIST CHANNEL ASSIGNMENTS

CROSS-REFERENCE TO RELATED APPLICATIONS

This application is a continuation of U.S. patent application Ser. No. 11/777,801, filed Jul. 13, 2007 and entitled "SYSTEMS AND METHODS FOR MAKING CHANNEL ASSIGNMENTS TO REDUCE INTERFERENCE AND INCREASE CAPACITY OF WIRELESS NETWORKS," which is a continuation of U.S. patent application Ser. No. 11/172,604, filed Jun. 30, 2005 and entitled "SYSTEMS AND METHODS FOR MAKING CHANNEL ASSIGNMENTS TO REDUCE INTERFERENCE AND INCREASE CAPACITY OF WIRELESS NETWORKS," which issued Aug. 14, 2007 as U.S. Pat. No. 7,257,376, the disclosures of which are incorporated herein by reference.

BACKGROUND

In wireless systems it is often desired to use all channels (or all of the allocated spectrums) in every cell. These systems are called N=1 reuse systems. In such systems it is possible for a mobile station (MS) to receive signals of equal power on the same channel from two base stations (BS).

Current methods of solving this problem include CDMA where different codes are transmitted by different BSs and, depending on the spreading factors, a signal can be extracted from the interference with greater reliability. Unfortunately, in such systems spreading reduces the overall through-put in direct proportion.

Another solution involves frequency hopping. In this case the BSs randomly select channels to send to the MS and if only a few mobiles are in use the chances of collisions can be made small because each channel is used only a small fraction of the time. However, as loading (increased MSs) increases, collision possibility increases until with 100% of possible users on at each BS collisions occur in every instance. The damage due to interference done at each instant depends upon the instantaneous transmitter power of the interfering BSs and the relative distances the MSs are from their respective BSs.

SUMMARY

There is disclosed a system and method for improving wireless system capacity by reducing collisions where the Signal to Interference Ratio (SIR) is high in systems having a channel reuse of 1. By intelligently assigning (ordering) the channel assignment in each of the interfering cells according to a pattern, for example, according to the distance from a BS, the MSs will become paired on the same channel in a manner to reduce interference between them. A second step is to optionally control the power of the BS and MS transmitter to further optimize user capacity or reduce interference.

In one embodiment, this intelligent assignment is accomplished by assigning MSs in one cell such that the MS having the strongest signal is assigned channel A while in the interfering cell, the MS with the weakest signal, is assigned to channel A. In another embodiment, certain preferred MSs are assigned either interference-free channels or channels paired with weak interference MSs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Reference is now made to the following descriptions taken in conjunction with the accompanying drawings, in which:

FIG. 2 shows one assignment pattern;

FIG. 4 shows one embodiment of an algorithm for assigning channels.

DETAILED DESCRIPTION

Figure 1:
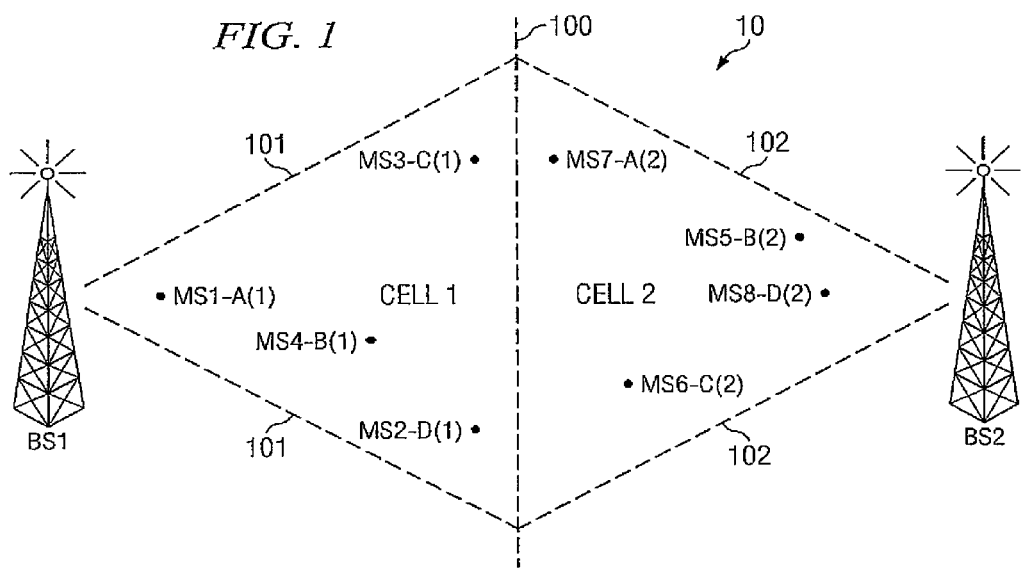
FIG. 1 shows one embodiment of wireless cells ordered according to a pattern.

FIG. 1 shows one embodiment 10 in which BS1 makes channel assignments for MSs from the nearest (strongest power levels) to the farthest (weakest power levels), while BS2 makes channel assignments to MSs from the farthest (weakest power levels) to the nearest (strongest power levels). This assignment pattern is shown in FIG. 2.

Using this channel assignment, pattern MS1-A(1) having a strong signal, is assigned channel A in cell 1. MS7 which is at the edge of cell 2, and has a relatively weak signal from BS2 is assigned the channel A in cell 2. This assignment avoids the situation where MS3 and MS7 are paired on the same channel. Were that to occur, S≈I for transmission in each direction from BS to MS and from MS to BS yielding high interference.

Each BS can make new channel assignments from time to time so that for the most part the MSs remain assigned according to their relative strength even though they are moving.

Intelligent assignments can be done in other ways to achieve different objectives. For example, some MSs can be designated as preferred users so that the preferred user will always be paired with the weakest interferer in every instance. For example, if MS4 was a preferred user it would be paired with MS7 in the example of FIG. 1.

Maximum capacity may be provided to a particular user. In such a case a clear channel could be guaranteed to the user or the user could be paired with the weakest user in the other cell.

Interference may also be reduced in a cell by having a BS and/or selected MS transmit at a slower rate at reduced power.

The strategies discussed herein can be implemented at each BS without prior knowledge of the signals and interferences at the interfering BS. An alternative would be a centralized controller that has access to the signal levels and the interference levels of all MSs, and which then implements a centralized strategy, say to maximize the capacity of the entire network. In principle, a computer could evaluate every possible pairing combination and select from that a desired result such as maximum network capacity or minimizing high interference conditions.

Figure 3:
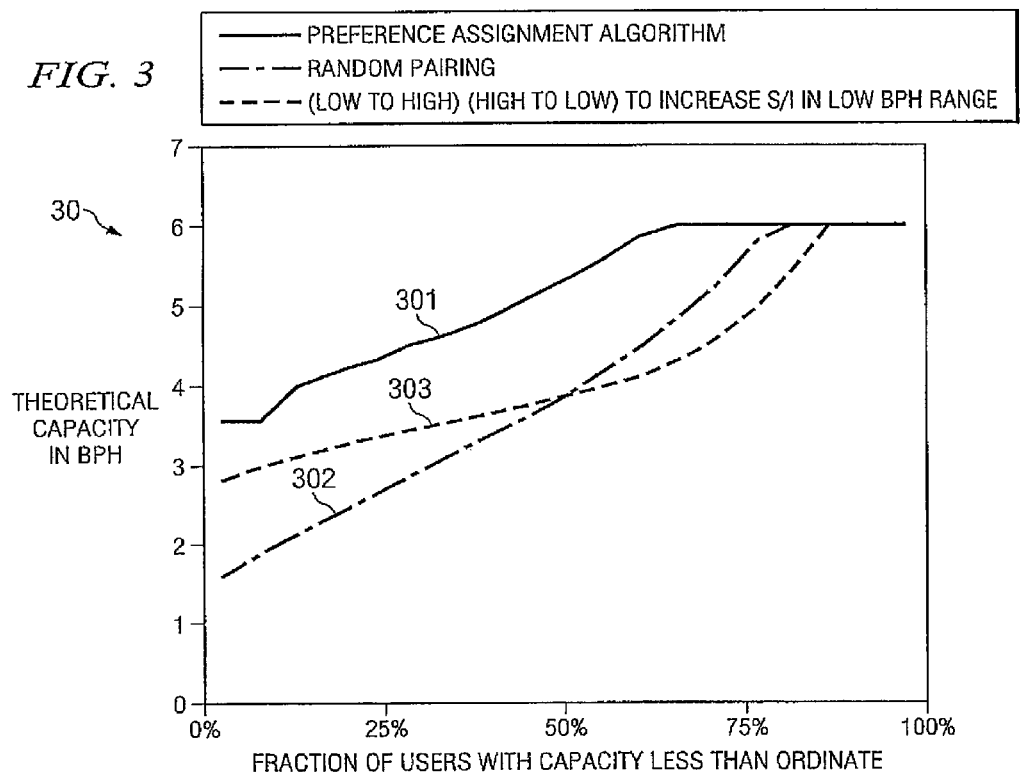
FIG. 3 shows a simulation of theoretical capacity distributions for random and intelligent channel assignment.

FIG. 3 shows simulation 30 of high to low ordering paired with the low to high (graph 303) at the interfering BS as shown in FIG. 2. Graphs 301, 302 and 303 represent the capacity distributions of the three strategies. For example, at the 25% point, this means 75% of all users enjoy capacities exceeding 4, 3 and 2.5 BPH respectively. Or looking the other way 25% of all users have capacity less than 4, 3 and 2.5 BPH. The results using 16 sub-carriers show increased bandwidth (theoretical capacity), i.e., a significant reduction in high interference events for a greater number of users over either the preference channel assignment method (graph 301) or random assignment (graph 302), all using 100% of the channels in both of the interfering cells. Note that using preference pairing (which can be a premium service available to select number of MSs) a higher capacity (graph 301) can be achieved, but for a lower number of MSs.

Graph 302 shows, for example, a typical OFDMA system where individual MS are assigned a subset of all the available sub-carriers. In a typical transmission slot the BS may have available 16, 32 or more sub-channels. A sub-channel usually has several sub-carriers, each carrying independent information. Normally, the sub-channels are assigned on a first come first serve basis to the mobile users who normally are randomly distributed within their respective cells.

Pairing using graph 303 can be changed, for example, as discussed above, every 5 MS, to be sure that in cell 1 the strongest station remains on channel A, while the weakest station is on channel D, while in cell 2 the weakest station is on channel A, while the strongest is on channel D. Strongest can be defined using any convenient metric so long as the potentially interfering cells agree on the metric. One example would be using high signal to interference ratios (SIR) as a measure of strength.

Using the preference assignment cell 1 would leave, say the first 5-10% of channels open for assignment to preferred customers, and would leave the last 5-10% of channels vacant. Cell 2 would do the reverse, i.e., leave its first 5-10% of channels vacant and assign its preferred customers to the last 5-10% of channels. Also, it could be established that preferred users receive the weakest interferences from the other cell, as discussed above. Graph 301 was simulated for the case of the preferred user being paired with the weakest interferer (weakest one out of 16 at random locations).

FIG. 4 shows one embodiment 40 of a process for assigning channels in a wireless system. Process 401 controls requests for service from a MS (user) and process 402 optionally determines if the requesting user is a preferred user. If it is then process 403 assigns a channel according to a class of service or other identifying characteristic of the MS depending upon contractual arrangements with the user.

If the requesting user is not a preferred user then process 404 determines relative signal strength, as discussed above, and process 405, following an assignment pattern as shown in FIG. 2, assigns a proper channel in conjunction with processes 406, 407, 408 and 409 which check to be sure there is no prohibition on the use of certain channels (such as, for example, would occur if certain channels were to be maintained vacant).

Process 410 controls the reassignment from time to time of the channel assignments to insure that the pattern established by FIG. 2 is maintained, at least on the average.

In one embodiment the allocated spectrum is divided into channels. A channel is defined as a portion (may be all) of the allocated spectrum being used for a specified period of time. The inventive concepts apply to FDMA, TDMA, TD-CDMA, OFDMA or combinations thereof.

Note that the capacity of a BS or the capacities of certain MSs can be raised or lowered by trading power for throughput (capacity). A simple example: If a user needs less capacity, then lower the power and change the modulation rate.

$C = \log_2 (1+S/N+I)$. Reduce S to ¼ S and the new C=½ the old C.

Increase S to 4 S and the new C is doubled.

This is a tradeoff Every time the BS lowers power it helps the neighbor cell, but if it increases power to certain MS it causes more interference. However, if the channels that are increased in power are part of the reserved set, then it may not matter.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining a strength of a signal at a base station, the signal being received wirelessly from a mobile station;
   determining whether the mobile station has a preferred status that allows the mobile station to be assigned to a reserved wireless channel in a first subset of wireless channels based on a preference assignment;
   responsive to a determination that the mobile station does not have the preferred status:
      determining a position in an ordering of the wireless channels based on signal strength; and
      assigning a wireless channel that corresponds to the determined position to the mobile station, the wireless channel being formed by a set of OFDMA subcarriers for a predetermined period of time;
   reserving the first subset of the wireless channels for a first set of mobile stations in a first cell that have preferred statuses, the first subset of the wireless channels having a restricted assignment status in a second cell;
   causing a second subset of the wireless channels to remain vacant by restricting an assignment status of the second subset of the wireless channels in the first cell; and
   assigning a third subset of the wireless channels to a second set of mobile stations in the first cell based on signal strength.

2. A method as described in claim 1, wherein the determining of the strength of the signal is performed responsive to receipt of a request from the mobile device at the base station for service.

3. A method as described in claim 1, wherein the determining of the signal strength is based at least in part on a signal to interference ratio (SIR).

4. A method as described in claim 1, wherein the ordering is arranged such that a relatively strong signal strength is assigned a respective said channel.

5. A method as described in claim 1, wherein the restricted assignment status of the first subset of the wireless channels comprises a prohibition of assignment of the first subset of the wireless channels to a third set of mobile stations in the second cell.

6. A method as described in claim 1, further comprising repeating the determining of the signal strength, the determining of the position in the ordering, and the assigning of the wireless channel at predefined intervals of time for the mobile station.

7. A method as described in claim 6, wherein the repeating results in the mobile station being reassigned to a different said wireless channel.

8. A method as described in claim 1, wherein the restricted assignment status of the first subset of the wireless channels comprises a restricted power level for a third set of mobile stations in the second cell.

9. A base station comprising hardware configured to;
   determine whether a mobile station has a preferred status that allows utilization of a preference assignment to assign the mobile station to a reserved wireless channel in a first subset of wireless channels;
   responsive to a determination that the mobile station does not have the preferred status, assign a wireless channel to the mobile station based on an ordering of the wireless channels and corresponding signal strength, the wireless channel being formed by a set of OFDMA subcarriers for a predetermined period of time;
   reserve the first subset of the wireless channels for a first set of mobile stations in a first cell that have preferred statuses, the first subset of the wireless channels having a restricted assignment status in a second cell that potentially interferes with the base station;
   restrict an assignment status of a second subset of the wireless channels in the first cell to cause the second subset of the wireless channels to remain vacant; and
   assign a third subset of the wireless channels to a second set of mobile stations in the first cell based on signal strength.

10. A base station as described in claim 9, wherein the signal strength is based at least in part on a signal to interference ratio (SIR).

11. A base station as described in claim 9, wherein the ordering of wireless channels is arranged such that a relatively strong signal strength is assigned a respective said channel.

12. A base station as described in claim 9, wherein the restricted assignment status of the first subset of mobile stations comprises a prohibition of assignment of the first subset of the wireless channels to a third set of mobile stations in the second cell.

13. A base station as described in claim 9, wherein the hardware is configured to repeat the assignment of the wireless channel at predefined intervals of time.

14. A base station as described in claim 13, wherein the repeating of the assignment results in the mobile station being reassigned to a different said wireless channel.

15. A base station as described in claim 9, wherein the restricted assignment status of the first subset of the wireless channels comprises a restricted power level for a third set of mobile stations in the second cell.

16. A mobile station comprising hardware configured to:
   form a request for communication to a base station; and
   receive a response from the base station indicating a wireless subchannel assigned to the mobile station for wireless communication with the base station, the wireless subchannel assigned by the base station using an ordering of wireless subchannels and corresponding signal strength, the wireless subchannel having a set of OFDMA subcarriers that form the wireless subchannel for a predetermined period of time, the wireless subchannel being drawn from a first subset of subchannels assigned by the base station to a set of mobile stations having preferred status in a first cell, the preferred status of the set of mobile stations allowing the first set of mobile stations to be assigned to reserved subchannels having substantially no interference from a second cell based on a restricted assignment status in the second cell, the ordering of the wireless subchannels comprising a second subset of subchannels assigned by the base station to remain vacant in the first cell and a third subset of subchannels assigned by the base station to an additional set of mobile stations in the first cell.

17. A mobile station as described in claim 16, wherein the signal strength is based at least in part on a signal to interference ratio (SIR).

18. A mobile station as described in claim 16, wherein the ordering of the wireless subchannels is arranged such that a relatively strong signal strength is assigned a respective said subchannel.

19. A mobile station as described in claim 16, wherein the restricted assignment status comprises a prohibition of assignment for the first subset of subchannels to a second set of mobile stations in the second cell.

20. A mobile station as described in claim 16, wherein the restricted assignment status comprises a restricted power level for a second set of mobile stations in the second cell.

\* \* \* \* \*